Patented Jan. 3, 1950

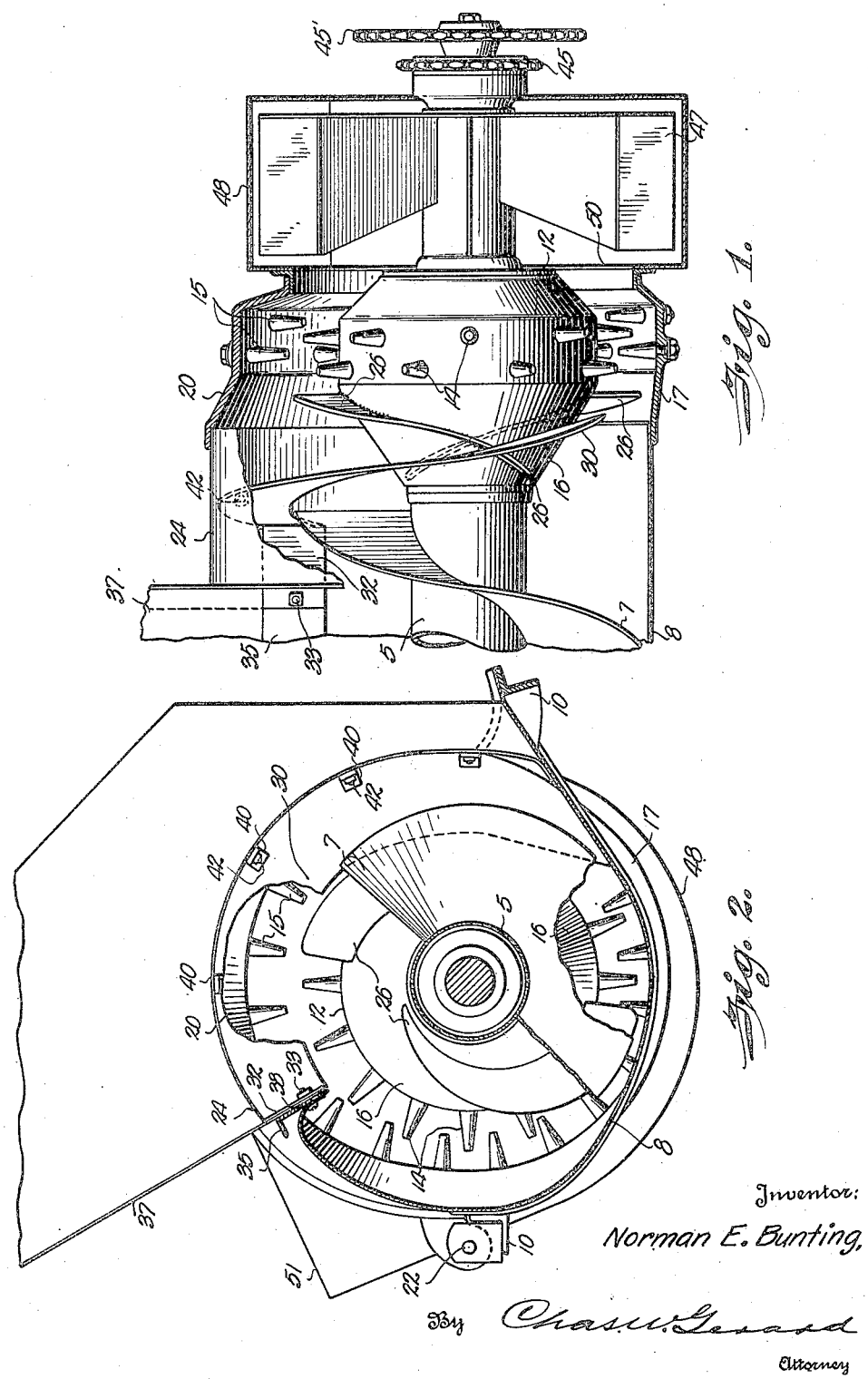

2,493,105

UNITED STATES PATENT OFFICE 2,493,105

COMBINATION GRAIN-FEEDING AND THRESHING MEANS FOR HARVESTERS

Norman E. Bunting, Cedar Rapids, Iowa, assignor to Bessie Bunting, Cedar Rapids, Iowa Application February 23, 1946, Serial No. 649,504

3 Claims. (Cl. 130—27)

The present invention relates to harvesting machinery, and aims to provide improvements in the grain feeding and threshing assembly of this type of apparatus, with a view to obtaining greater efficiency and capacity in the operation of such equipment.

Accordingly, I have devised various features of improvement in the grain feeding and threshing assembly, which tend to promote a more efficient and uniform feeding action, as regards the movement of the cut grain to the threshing unit. This consists partly in assuring that there is no gap or inoperative feeding interval in the course of the grain in its movement to the thresher unit, and hence no dead zone occupied by inert masses of the grain material. The provision for accomplishing this result comprises novel grain guiding and impelling elements so combined and arranged with the remaining equipment as to generate continuous movement of the cut grain in its travel to the thresher unit.

A further feature of the improvements consists in making effective provision for the passage of the grain through the thresher unit without clogging or choking action, and thus overcoming one of the main defects in the operation of such units or assemblies in previous apparatus of this type. My improved construction arrives at the proper solution by providing for an eccentric relationship between the thresher cylinder and a portion of the concave member, and thereby opening up the parts or elements of the thresher unit at the point where the cut grain is delivered thereto.

It is also an object of the invention to devise a construction which will largely eliminate dust conditions, and result in a much cleaner operation of the apparatus.

With the foregoing general objects in view, as well as minor objects which will appear in the course of the detail description or specification, the invention will now be described by reference to the accompanying drawings illustrating one preferred form of embodiment of the proposed improvements, after which those features and combinations will be particularly set forth and claimed.

In the drawing—

Figure 1 is a longitudinal sectional view showing the delivery portion of a grain auger where it discharges to a thresher unit, and the adjoining fan or blower unit, the casing structure being represented as in section to reveal the interior operating elements in plan view; and Figure 2 is a transverse sectional view of said apparatus.

Referring now to the accompanying drawing in detail, only those portions of the grain auger, thresher cylinder and fan or blower unit construction which involve the present features of improvement are herein illustrated or described.

The auger or grain conveyor comprises the usual longitudinal shaft member 5 carrying the spiral or screw conveyor flight 7 and operating within the conventional casing structure 8 which is supported by the framework 10 as represented in Figure 1.

The thresher unit comprises a thresher cylinder 12 provided with a plurality of radially projecting teeth 14 for cooperation with a similar set of teeth 15 projecting radially inward from a fixed concave structure which is also supported by the aforesaid framework. This concave structure is in two sections, comprising a lower approximately semicircular section 17 having its inwardly projecting teeth 15 extending into intermeshing relation with the teeth 14 of the cylinder 12, and also an upper approximately semicircular section 20 which is pivotally mounted at 22 to the rear portion of said framework and suitably secured to the front portion thereof as indicated in Figure 2 of the drawing. However, this upper concave section 20 is of such a curvature as to carry its inwardly projecting teeth 15 in radial relation to a center which is displaced slightly above the center of the cylinder 12 carrying the rotating set of teeth 14, so that the latter (for a portion of their travel within the upper concave section 20) move entirely out of meshing relation to the fixed teeth 15 of said concave section, as will be evident from the showing in both Figures 1 and 2 of the drawing.

The size of the casing surrounding the discharge or delivery end of the auger conveyor is enlarged—as indicated at 24—sufficiently to correspond to the eccentric contour of the concave section 20; and between the discharge end of the auger flight 7 and the thresher teeth 14 the thresher cylinder 12 is formed with a tapered or conical portion 16 which is provided on opposite sides with two spiral flights or blades 26 spanning the interval between said thresher teeth and the end of the auger flight 7. The curvature of these spiral flights 26 is such that as they rotate with the thresher cylinder they will operate to supplement the feeding action of the auger conveyor to impel the grain into the thresher chamber, or space inside the concave structure above described.

As a means of controlling or guiding the grain, in its movement from the auger conveyor to the thresher unit, a spiral fin or blade 30 is provided for operating as a fixed baffle or guiding fin extending through the enlarged upper portion 24 of the casing and opposite to and in front of the teeth 15 of the upper concave section 20. The upper end of this fin or blade 30 is formed with a lateral extension 32 which is attached by bolts 33 to the top margin of the casing or housing 8, to which margin the so-called retarder bar 35 and the back apron member 37 are also attached; and conveniently said bolts are used for attaching all these parts in the relation illustrated in Figure 2, the said retarder bar being thereby also adjustably mounted, by means of suitable slots 38. The outer margin of the fin or blade 30 is also supported by means of brackets 40 and bolts 42 which are secured to the interior of the casing or housing structure at the discharge end of the auger conveyor. As shown in Figure 2, the upper end of said spiral fin or blade 30 is located at approximately the height where the teeth 14—15 become completely unmeshed, the width of said fin or blade being sufficient to span the space between the auger 7 and the surrounding casing 24, and said fin or blade 30 continuing on around to the opposite side of the auger axis, where the thresher cylinder teeth 14 are moving again in meshing relation to the teeth 15 of the lower concave section 17.

The auger conveyor and thresher units are adapted to be driven independently by suitable drive connections to the gears 45 and 45', and the thresher cylinder being driven by the same drive as a fan or blower member 47 in the casing 48 into which the grain is discharged from the thresher chamber through a passage 50, and thence discharged by way of the outlet 51 into any desired form of separator apparatus (not shown). Such features of the apparatus are not illustrated or described in any detail, inasmuch as the present invention involves no material changes therein.

In the operation of apparatus as heretofore constructed, considerable trouble has been experienced as regards the clogging up of the thresher unit and hence a slowing down of and eventual complete stopping of the operation; and after each stopping of the machine from this clogging action, considerable difficulty is often experienced in resuming the operation and getting back to normal headway, all of which simply results in a diminishing of the working capacity of the machine.

By means of the aforesaid improved construction, whereby a portion of the thresher unit is in effect opened up or expanded, by a lifting of one of the concave sections sufficiently to disengage the corresponding thresher teeth from their meshing relation with the teeth of the thresher cylinder, a practical and effective relief is afforded from such clogging tendency and consequent interruption or stoppage of the normal operation of the machine.

As the grain material is delivered by the auger conveyor into the casing portion 24, the location of the fin or blade 30 is such as to shield the entrance to the upper portion of the thresher chamber, so that the combined action of the said fin 30 and the spiral blades 26 is to propel the grain for the most part into the lower portion of the thresher chamber where the threshing action is most effective by virtue of the meshing operation of the thresher teeth 14 and 15.

By thus overcoming the disadvantages due to clogging tendency of the parts of the thresher unit, the improved construction eliminates the corresponding delays incurred in the stopping of the machine, and moreover enables the machine to travel and operate at a higher rate of speed, with corresponding advantages and benefits as regards the materially increased working capacity resulting from such operation.

Moreover it is also found that the entire operation with the improved construction is much cleaner and freer from the formation of dust clouds, as compared with the usual conditions resulting from the operation of the conventional types of harvester apparatus.

It will therefore be seen that I have devised improved features of construction having distinct operating advantages over prior forms of apparatus in the particulars noted, and while I have described and illustrated what I have found to constitute entirely practical and satisfactory forms of embodiment of said improvements, I desire to be understood as expressly reserving the right to make such changes or modifications as may fairly fall within the spirit and scope of my invention as defined by the following claims.

What I claim is:

1. In a thresher construction, a fixed concave member having inwardly projecting teeth around its inner periphery, a rotatable cylinder within said concave member and having outwardly projecting teeth around its periphery, the said concave member, cylinder and the teeth thereon being so related that the outermost ends of the teeth on said cylinder extend outwardly beyond the innermost ends of the teeth on one side of said concave member and outwardly to a position inwardly of the inner ends of the teeth on the diametrically opposite side of said concave member.

2. In a thresher construction, a fixed concave member having inwardly projecting teeth around its inner periphery, a rotatable cylinder within said concave member and having outwardly projecting teeth around its periphery, the said concave member, cylinder and the teeth thereon being so related that the outermost ends of the teeth on said cylinder extend outwardly beyond the innermost ends of the teeth on one side of said concave member and outwardly to a position inwardly of the inner ends of the teeth on the diametrically opposite side of said concave member, the axis of said cylinder being nearer to said one side of said concave member than to said diametrically opposite side.

3. In a thresher construction, a fixed concave member having inwardly projecting teeth around its inner periphery, a rotatable cylinder within said concave member and having outwardly projecting teeth around its periphery, the said concave member, cylinder and the teeth thereon being so related that the outermost ends of the teeth on said cylinder extend outwardly beyond the innermost ends of the teeth on one side of said concave member and outwardly to a position inwardly of the inner ends of the teeth on the diametrically opposite side of said concave member, a screw type feed conveyor in advance of said rotatable cylinder for feeding grain axially thereto, an inwardly directed fixed member extending longitudinally of said conveyor adjacent the periphery thereof, said fixed member terminating in a fixed helical fin adjacent said cylinder, said fin being directed inwardly toward said conveyor and extending at least partially therearound and helically toward said cylinder.

NORMAN E. BUNTING.

REFERENCES CITED

The following references are of record in the file of this patent:

UNITED STATES PATENTS

| Number | Name | Date |
| --- | --- | --- |
| 1,159,822 | Bartholomew | Nov. 9, 1915 |
| 1,884,152 | Nye | Oct. 25, 1932 |
| 1,907,035 | Baldwin | May 2, 1933 |
| 2,050,631 | Schlayer | Aug. 11, 1936 |